Nov. 6, 1962   J. GOORISSEN ETAL   3,062,691
METHOD OF PRODUCING ELECTRODE MATERIAL
FOR SEMI-CONDUCTING DEVICES
Filed Oct. 26, 1959
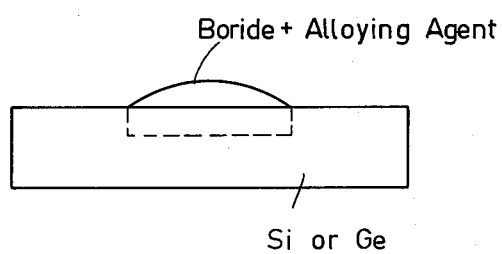
INVENTORS
J. GOORISSEN
J. A. MANINTVELD
BY
AGENT

United States Patent Office 3,062,691
Patented Nov. 6, 1962

3,062,691
METHOD OF PRODUCING ELECTRODE MATERIAL FOR SEMI-CONDUCTING DEVICES
Jan Goorissen, Emmasingel, Eindhoven, and Jan Adrianus Manintveld, Mollenhutseweg, Nijmegen, Netherlands, assignors to North American Philips Company, Inc., New York, N.Y., a corporation of Delaware
Filed Oct. 26, 1959, Ser. No. 848,769
Claims priority, application Netherlands Oct. 31, 1958
9 Claims. (Cl. 148—1.5)

The present invention relates to a method of producing electrode material for semi-conducting devices such as transistors and diodes, which material contains a basic material and boron. The term "basic material," which is sometimes known as a "contact soldering material" or an "alloying agent" is to be understood to mean a material, in particular a metal or an alloy, which when fused onto a member of semi-conducting material consisting of one or both elements of the fourth group of the periodic system having an atomic number between 13 and 33, in particular germanium and/or silicon, dissolves only a limited part of the semi-conducting material at a suitable temperature, a segregated layer of this semi-conducting material forming on the initial crystal lattice of the body during subsequent cooling. Meanwhile, this segregated layer may have absorbed active impurities responsible for its conductivity and/or conductivity type from the basic material. In other words, the basic metal or alloy mass is a solvent for the semi-conductive material and has a lower melting point than the latter or may form with the latter an eutectic alloy with a lower melting point than the semi-conductive material. Familiar basic materials are, for example indium, lead, tin and bismuth for fusing to germanium, and aluminum or gold for fusing to silicon, as well as alloys of these elements, but all these elements and also thallium and alloys of these elements may be used as basic materials for fusing to germanium and silicon as well.

In the present invention, the segregated layer has an exceedingly high concentration of the acceptor boron so that it has p-conductivity and an exceedingly low resistivity.

The present invention has inter alia for its object to produce such electrode material in a simple and efficient manner.

For this purpose, in accordance with the invention, boron in the form of a boride is added to a melt of the basic material. The boride need not exclusively be a boride of a single element but may also be a boride of a plurality of elements or a mixed crystal of two or more borides. It has been found that, in general, borides readily alloy with the molten basic material.

In the present specification, the term "alloy" does not only include the formation of an alloy comprising one phase, but also the formation of an alloy made up of two or more phases. As a matter of fact, it is not ruled out and, in the case of high boron concentrations, even probable that a part of the added boron is absorbed in a separate phase on solidification.

The boron is preferably added in the form of a boride of the elements having the atomic numbers 23 to 28 of the fourth period of the periodic system, that is the elements vanadium, chromium, manganese, iron, cobalt, and nickel. These borides are readily soluble in the usual basic materials, in particular in aluminum. In the present case, the borides FeB and $CrB_2$ proved to be highly satisfactory. The boron may be added in the form of a boride of an element initially present in the basic material. This has the advantage that in this manner, solely boron is added as a new element to the basic material, and no element is introduced which later, in the manufacture of electrodes, may adversely affect the electrical qualities of this electrode.

It has been found that the quantity of boron added in the form of a boride to the basic material is not critical, since it is variable within wide limits. Even a quantity as low as corresponds to 0.02 atom percent of boron relative to the quantity of basic material is sufficient for improving the electrical qualities of electrodes manufactured from the electrode material. As a rule, the final electrode-forming material will contain at the most 5 atomic percent of boron. In practice however, a quantity of boride will preferably be used corresponding to values between those mentioned above, for example corresponding to 0.1 to 2.5 atom percent of boron relative to the quantity of basic material, while higher percentages may also yield satisfactory results.

The invention will be better understood from the following description and the accompanying drawing.

The FIGURE of the drawing shows schematically a front elevation of a slab of semi-conductive material consisting of silicon or germanium onto which a contact has been applied by alloying an electrode-forming material prepared by dissolving a boride in an alloying agent. A p-type region, consisting of silicon or germanium respectively highly doped with boron, is obtained forming a junction, indicated by the dashed line, with the bulk of the slab. When the bulk is p-type a p+p junction and when the bulk is n-type a p-n junction is formed. Both junction types may be used in semi-conductive devices in order to improve the characteristics of these devices, for instance as an ohmic contact or a high-efficiency emitter respectively.

In order that the invention may be readily carried into effect, three examples are given below.

*Example I*

110 mgs. of powdery iron boride containing 18% of boron and substantially consisting of FeB were introduced into a tube of pure aluminum weighing 2 gms. and closed at one end. This tube was subsequently clamped with its open end onto the end of tungsten bar.

48 gms. of pure aluminum were introduced into a crucible consisting of aluminum oxide and were heated to a temperature of 1300° C. in a gas mixture made up of 70 volume percent of nitrogen and 30 volume percent of hydrogen.

Next, the tube on the tungsten bar was immersed in the melt thus formed well under the level of the latter in order to prevent the boride from being covered by a protective coating of aluminum oxide floating on the melt. The aluminum tube melted and the boride alloyed with the aluminum.

The tungsten bar was subsequently removed from the melt and the latter caused to solidify by cooling.

Averaged over the quantity of aluminum, the iron addition amounted to 0.18% by weight and the addition of boron amounted to 0.04% by weight corresponding to approximately 0.1 atom percent of boron.

The electrode material thus obtained may be rolled out in the usual manner to a thin sheet from which small discs can be stamped for making electrodes on silicon bodies by alloying. As an example thereof, a small disc of this boron-doped aluminum is placed in contact with the surface of a 1 ohm-cm., n-type silicon wafer, and the assembly heated at 750° C. in hydrogen for about 2 minutes and subsequently cooled down slowly within 30 minutes to room temperature to form a highly-conductive p-type region within the silicon wafer. Such a highly conductive p-type region would be extremely useful as an emitter in a silicon transistor.

In a similar manner, electrode material was manufactured by adding 280 mgs. of the iron boride at a temperature of 1400° C. to a melt totalling 50 gms. of pure aluminum, approximately 0.1% by weight or approximately 0.25 atom percent of boron being added to the aluminum.

*Example II*

In a manner similar to Example I, 170 mgs. of chromium boride powder having a boron content of 29% by weight and substantially consisting of $CrB_2$ were alloyed with 50 gms. of pure aluminum at 1400° C., the percentage of boron added to the aluminum amounting to approximately 0.1% by weight or 0.25 atom percent. The electrode material thus obtained is suitable for manufacturing electrodes on silicon bodies by alloying.

*Example III*

Similarly to the preceding examples, 120 mgs. of aluminum boride powder of the formula $AlB_{12}$ were alloyed with 50 gms. of pure aluminum at 1400° C., the percentage of boron added to the aluminum amounting to approximately 0.1% by weight or approximately 0.25 atom percent of the overall quantity of aluminum. The electrode material thus obtained contained only the elements aluminum and boron and is suitable for manufacturing electrodes on silicon bodies by alloying.

Instead of using the borides referred to in the examples, also other borides such as $BaB_6$, $Mg_3B_2$, $LaB_6$, $VB_2$ and $NiB$ have been added to aluminum.

In these examples, in particular aluminum has been referred to as a basic material. However, the invention is not limited to this basic material or to any one of the basic materials referred to in this specification. Neither need the basic material consist of a single element, since it may alternatively be an alloy consisting of a plurality of elements.

Alternatively, materials such as other significant impurities may, without departing from the scope of the invention, be introduced into the basic material during or after adding the boride.

As a further alternative, a plurality of borides, either of the same element or of a plurality of elements, may be added to the melt. Furthermore, mixed crystals of borides of two or more elements may, if desired, be used.

What is claimed is:

1. A method of making a boron-doped region in a semi-conductive body, comprising providing a substance selected from the group consisting of borides of vanadium, chromium, manganese, iron, cobalt, nickel, and mixed crystals of said borides, adding said boride substance to a melt of an element selected from the group consisting of indium, lead, tin, bismuth, aluminum, thallium and gold thereby dissolving it therein to from a boron-containing alloy of the said element, and fusing said boron-containing alloy to the semi-conductive body to incorporate boron into a region of the body.

2. A method as set forth in claim 1 wherein the boride is $CrB_2$.

3. A method as set forth in claim 1 wherein the boride is $FeB$.

4. A method as set forth in claim 1 wherein the element is aluminum.

5. A method of making a boron-doped region in a semi-conductive body, comprising first, apart from the semi-conductive body, adding a boride to a melt of an alloying agent to dissolve same therein, and thereafter fusing a solidified portion of said melt to said semi-conductive body.

6. A method as set forth in claim 5 wherein the boride added is a boride of the alloying agent.

7. A method of making a boron-doped region in a semi-conductive body, comprising providing a substance selected from the group consisting of borides of vanadium, chromium, manganese, iron, cobalt, nickel, and mixed crystals of said borides, adding said boride substance to a melt of an element selected from the group consisting of indium, lead, tin, bismuth, aluminum, thallium and gold thereby dissolving it therein, cooling the melt to form a boron-containing alloy of the said element, forming from the latter a small mass of material, and thereafter fusing the said small mass to said semi-conductive body to incorporate boron into a region of the body.

8. A method as set forth in claim 7, wherein the boride is added in an amount at which the small mass formed from the cooled melt contains between 0.02 and 5 atomic percent of boron.

9. A method making a boron-doped region in a semi-conductive body, comprising providing a substance selected from the group consisting of borides of aluminum, barium, magnesium and lanthanum, adding said boride substance to a melt of an alloying agent for the semi-conductive body thereby dissolving the boride in the melt, cooling the melt to form a boron-containing alloying agent, and thereafter fusing a solidified portion of said boron-containing alloying agent to said semi-conductive body to incorporate boron into a region of the body.

References Cited in the file of this patent

UNITED STATES PATENTS

| | | |
|---|---|---|
| 2,792,538 | Pfann | May 14, 1957 |
| 2,806,807 | Armstrong | Sept. 17, 1957 |
| 2,823,102 | Selker | Feb. 11, 1958 |
| 2,829,999 | Gudmundsen | Apr. 8, 1958 |
| 2,877,147 | Thurmond | Mar. 10, 1959 |
| 2,986,481 | Gudmundsen | May 30, 1961 |

OTHER REFERENCES

Seybolt: Translation of the American Society for Metals, vol. 52, pages 971–989 (1960).

Paskell: Semiconductor Abstracts, vol. III, 1955, abstract 287.